Feb. 19, 1957 H. N. SHAW 2,781,718
AUTOMATIC FLOATING COVERS FOR FRY KETTLES
Filed Nov. 16, 1954 2 Sheets-Sheet 1
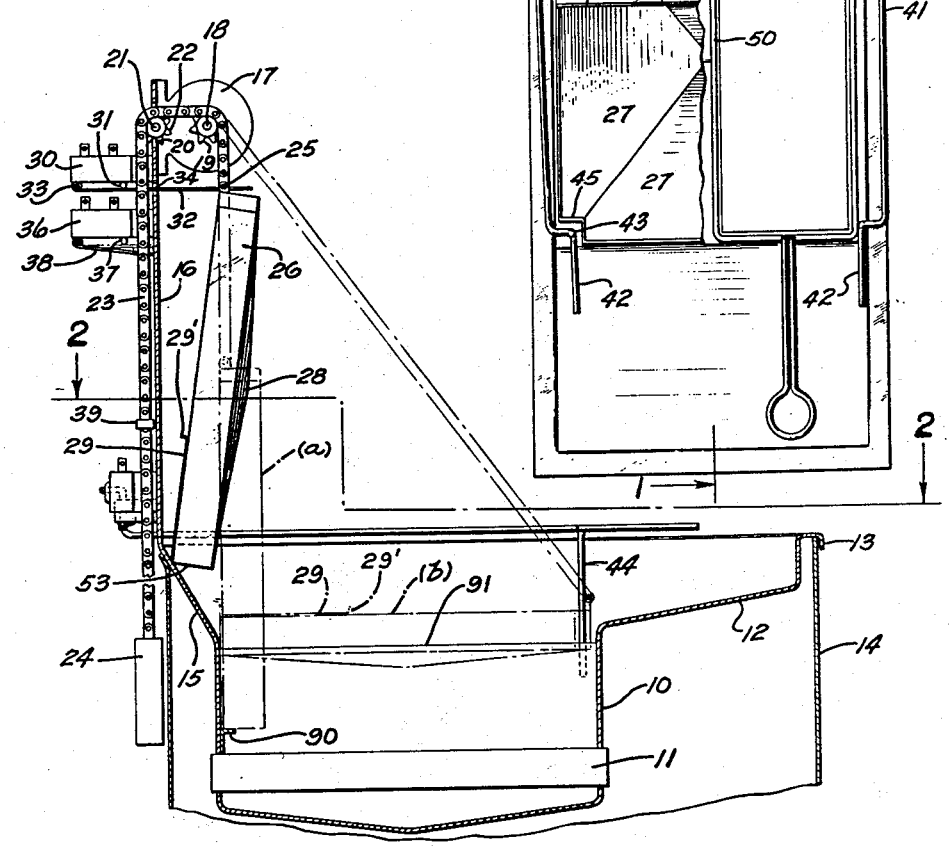
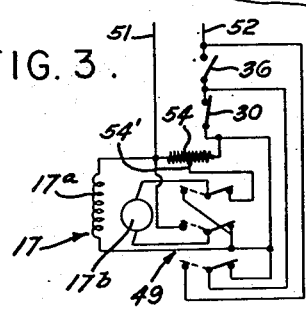
INVENTOR.
Harold N. Shaw
BY
Morsell & Morsell
ATTORNEYS

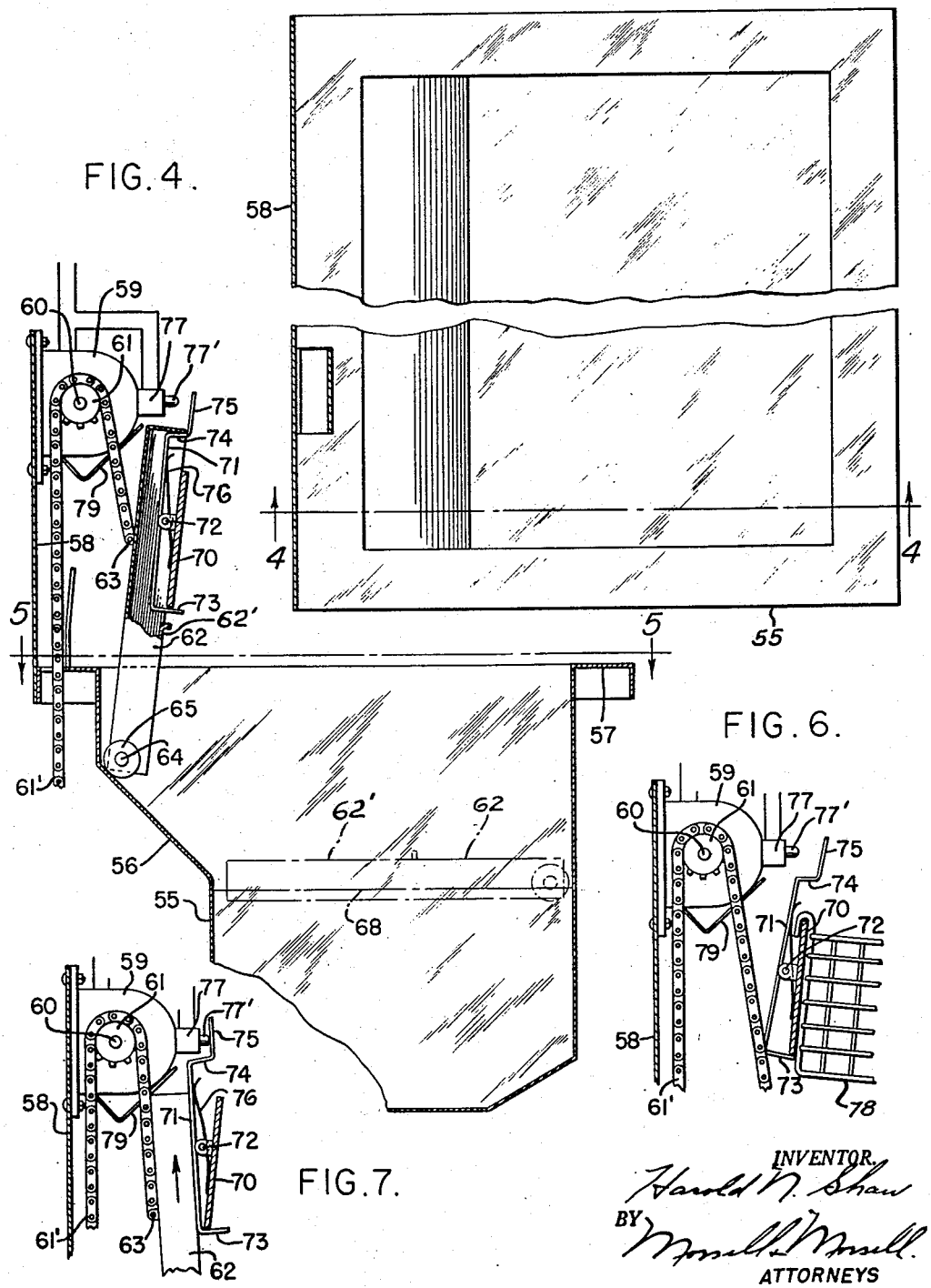

United States Patent Office 2,781,718
Patented Feb. 19, 1957

2,781,718

AUTOMATIC FLOATING COVERS FOR FRY KETTLES

Harold N. Shaw, Erie, Pa.

Application November 16, 1954, Serial No. 469,129

13 Claims. (Cl. 99—403)

This invention relates to improvements in automatic floating covers for fry kettles.

In ordinary usage the fat in a fry kettle breaks down and has to be discarded after a few days' time. This is particularly true in short order restaurants where the fry kettle has to be kept hot almost continuously. In such restaurants, however, the fat is used for actual cooking only a small percentage of the time and such a situation is, therefore, wasteful. Tests which have been made in connection with the development of the present invention indicate that most of the breakdown of the fat occurs at the surface where the hot fat comes in contact with the air.

In my pending application, Serial No. 186,734, filed September 26, 1950, a floating cover for fry kettles is disclosed, together with means rendering it relatively safe and convenient for a restaurant cook to move the cover into and out of fat-covering position.

In my pending application, Serial No. 410,590, filed February 16, 1954, a floating cover for fry kettles is disclosed wherein there is semi-automatic means for keeping the surface of the fat covered when the fry kettle is not in use.

It is a general object of the present invention to provide a floating cover for fry kettles wherein the cover is automatically raised and lowered in response to manipulations of the frying basket so that the fat is automatically kept covered between uses without any attention from the cook.

A more specific object of the invention is to provide an automatically operated cover as above described wherein it is unnecessary to employ a latch for releasably holding the cover in raised position.

A more specific object of the invention is to provide a construction wherein there is a control arm at the side of the kettle which is automatically moved to a position where it initiates raising of the cover when the frying basket is in proper place in the kettle, and which automatically initiates lowering movement of the cover to fat covering position when the basket is removed from the kettle.

A still further object of the invention is to provide a fry kettle as above described wherein the cover is operated in such a manner as to eliminate splashing of the fat.

A still further object of the invention is to provide a fry kettle as above described wherein a floating cover is arranged in a novel manner to eliminate the necessity of having a floating hinge connection between the cover and kettle.

A more specific object of the invention is to provide a motor driven automatic cover for fry kettles together with means for so controlling the speed of the motor as to prevent the splashing of fat.

With the above and other objects in view, the invention consists of the improved automatic floating cover for fry kettles, and all of its parts and combinations, as set forth in the claims, and all equivalents thereof.

In the accompanying drawings, illustrating two different embodiments of the invention, in which the same reference numerals designate the same parts in all of the views:

Fig. 1 is a vertical sectional view through a fry kettle taken approximately on the line 1—1 of Fig. 2, parts being broken away, the floating cover being shown by full lines in raised position, and the dot and dash lines indicating two different lowered positions;

Fig. 2 is a sectional view taken on line 2—2 of Fig. 1;

Fig. 3 is a wiring diagram showing an electrical system associated with the cover operating motor;

Fig. 4 is a vertical sectional view through a fry kettle showing a modified form of cover moving mechanism, the view being taken approximately on the line 4—4 of Fig. 5, parts being broken away, and the dot and dash lines indicating a lowered position of the floating cover;

Fig. 5 is a sectional view taken along the line 5—5 of Fig. 4, part being broken away;

Fig. 6 is a fragmentary vertical sectional view, similar to the upper portion of Fig. 4 showing the position of the parts when the frying basket is on the hanger and before the floating cover has been raised; and Fig. 7 is a view similar to Fig. 6 showing the position of the parts as the cover is being pulled upwardly and just before it has been latched in raised position.

Referring more particularly to Figs. 1 to 3 inclusive of the drawing, the numeral 10 designates a fry kettle of a type suitable for use for deep fat frying in restaurants. Electric heating elements or any other suitable means may be employed in the tube 11 for heating the fat. The fry kettle may also be provided with a suitable foam ledge such as that shown at 12 which projects forwardly from the upper portion of the kettle. The front and sides of the kettle are preferably flanged outwardly and downwardly to provide a channel shaped rim 13. An outer casing 14 may surround the kettle if desired. The upper portion of the back of the kettle is inclined rearwardly and upwardly as at 15 to provide an inclined guiding surface, and said surface connects with the bottom of a vertically extending back panel 16, the latter projecting a substantial distance above the top of the kettle.

Secured to the upper portion of the back panel 16 is an electric motor 17 having a drive shaft 18 which drives a sprocket wheel 19. Disposed rearwardly of the sprocket wheel 19 and supported for rotation in an opening 20 of the back panel 16 on a shaft 21 is an idler sprocket 22. A chain 23 is trained over the sprockets 19 and 22. One end of the chain is adapted to hang downwardly along the back face of the back panel 16 and has a weight 24 connected thereto. The other end of the chain is connected as at 25 to the forward end of a floating cover 26.

The cover 26 has a depressed bottom formed by four triangular areas 27 which meet at an apex 28 in approximately the center of the bottom. The inner portion of the top of the cover is closed by a deck 29, the forward edge of the deck being preferably flanged upwardly as at 29'.

Mounted on the rear of the back panel 16 is an "up" limit switch 30 having an operating button 31 adapted to be operated by a lever 32, said lever being hinged to the switch as at 33 and having its other end projecting forwardly through an opening 34 in the back panel, the extreme forward end of the lever being positioned to be engaged by the cover 26 when the latter is in the raised position of Fig. 1 so as to cause actuation of the switch 30 to shut off the motor when the cover is fully raised.

Also mounted on the back panel is a "down" limit switch 36 having an operating button 37 and having a hinged lever 38 which is adapted to be engaged by a stop member 39 on the chain 23 when the cover is in a completely lowered position to cause actuation of the switch 36 and shutting off of the motor 17.

Pivoted in eyes 40 projecting from the rear of the kettle are L-shaped control arms 41, one for each side of the kettle. The forward end of the side extent of each arm 41 is bent inwardly and then forwardly to provide an offset portion 42 and to provide inwardly offset bends 43. Projecting downwardly into the kettle from each bend 43 is an abutment rod 44, it being noted that the forward corners of the floating cover 26 are notched out as at 45 to clear the abutment rods 44.

One portion of each of the L-shaped arms 41 extends toward the center of the back panel as at 46 and has an inwardly bent end 47 which is adapted to engage the operating button 48 of a reversing and interlock switch 49 to operate the latter when in the position of the right hand control arm 41 of Fig. 2.

The particular kettle illustrated is equipped with twin frying baskets 50, only one being shown in Fig. 2. When one or the other of the frying baskets 50 is in proper position in the kettle it will engage the abutment rod 44 to force the lever arm 41 outwardly and cause operation of the reversing switch 49. When both of the baskets are out of the kettle, then the spring pressure of the button 48 of the reversing switch will force the arms back to the position shown for the left hand arm of Fig. 2.

In the wiring diagram of Fig. 3 the electric motor 17 is shown as including a field 17a and an armature 17b. The circuit also includes line wires 51 and 52 and the reversing and interlock switch 49. The diagram also illustrates the "up" limit switch 30 and the "down" limit switch 36. In addition, the wiring diagram discloses a resistor 54 which serves as a potentiometer and which extends across the line and which has a tap 54' for furnishing lower voltage to the armature when slow speed operation is required as will be hereinafter described.

In use of the device of Figs. 1 to 3 inclusive when the kettle is being used for cooking, then one or both of the baskets 50 is in proper position in the kettle as shown by the basket 50 on the right hand side of Fig. 2. When one or both of the baskets is in this position then one or both of the arms 41 has its side portion pushed outwardly due to engagement of the frying basket with one of the depending abutment rods 44. When thus engaged the bent portion 47 at the opposite end of the arm 41 is holding the push button of the reverse and interlock switch 49 inwardly as shown on the right hand side of Fig. 2. When one or both of the baskets is in the position shown at the right hand side of Fig. 2, then the floating cover 26 is maintained in the raised position shown by full lines in Fig. 1.

If both frying baskets 50 are removed from the kettle or if only one basket is in the kettle and it is in an incorrect position, then both of the levers 41 will move to the position illustrated by the left hand lever of Fig. 2 releasing the push button 48 of the reversing and interlock switch 39. This will cause operation of the electric motor 17 at slow speed (for a reason to be hereinafter explained in connection with the wiring diagram) to slowly lower the cover 26 into the fat without splashing. During such lowering movement the edge 53 of the cover is guided downwardly by the inclined surface 15 and the cover then moves straight downwardly along the rear wall of the kettle to the position indicated by the dot and dash lines (*a*) until the edge 53 rests on a step bracket 90. During this movement it will be noted that the cover is partially immersed below the level 91 of the fat. However, no fat can enter the cover because the deck 29 extends upwardly beyond the point of immersion.

Continued lowering action causes the cover to move to the floating position indicated by the dot and dash line (*b*). When the cover is fully lowered, then the stop 39 on the chain 23 will engage the lever 38 of the "down" limit switch 36 to operate said switch and open the circuit to the electric motor 17. Thus the fat is fully covered by the floating cover 26 during periods of disuse to prevent oxidation, and such lowering of the cover to fat protecting position takes place automatically, without any attention from the cook, whenever the fry baskets are removed from the fat. When the cook is desirous of again using the fat, then as soon as the basket 50 is moved toward operating position in the kettle so that a portion engages one of the abutment rods 42, then the button 48 of the reversing and interlock switch 49 is actuated to cause operation of the electric motor 17. This will cause raising of the cover at a speed several times greater than the speed of lowering movement. When the cover 26 reaches the position of Fig. 1 the lever 32 will be automatically pushed upwardly to engage the button 31 and operate the "up" limit switch 30 to shut off the electric motor.

The reversing and interlock switch 49 which includes the three switch blades shown in Fig. 3 is operated as a unit. When a side arm is moved over by a basket, as at the right hand side of Fig. 2, the switch blades are moved to the dotted position of Fig. 3. When in this position the interlock switch shorts the open "down" limit switch 36 and the motor pulls the cover up until the "up" switch 30 is opened. When the side arm is released by the basket the action is reversed, the blades of the switch 49 being in the full line position of Fig. 3 and causing the motor to run in the opposite direction due to the armature 17b being reversed. It is desirable that this lowering movement take about five seconds time to prevent splashing when the cover hits the fat. By having the resistor 54 across the line wires 51—52, the tap 54' provides the low voltage necessary for slow speed operation in the down direction. When the reversing switch blades are in the dotted line position of Fig. 3, then the armature 17b is connected across the line wires. When the blades are in the full line position of Fig. 3, the armature is connected through 54' of the potentiometer. This point 54' can, of course, be adjusted to provide any desired voltage. The field 17a is across the line in both cases. The current required by the armature is so low that the power loss of the potentiometer is negligible. This circuit is for a shunt direct current motor. For alternating current a series motor may be used with the field in series with the resistor. The friction of the motor brushes holds the cover up. Other means adjacent the kettle may be used to operate the control switches.

Referring now more particularly to the form of the invention shown in Figs. 4, 5 and 6, the numeral 55 designates a fry kettle whose rear wall is offset in an angular direction rearwardly and upwardly as at 56, there being a downturned channel-like rim 57 surrounding the upper edge of the kettle. A wall 58 which projects upwardly from the rear portion of the rim 57 supports an electric motor 59, the latter having a drive shaft 60 on which a sprocket wheel 61 is rigidly mounted. A chain 61' is trained over the sprocket wheel 61 and has an end connected to the bottom of the floating cover 62 as at 63. The floating cover is generally pan-shaped, as illustrated in Fig. 4 having a deck 62' which covers its forward portion, and at the forward end of each side wall it has a laterally projecting stub axle 64, which axles rotatably support wheels 65, one on each side of the pan. These wheels are of sufficient diameter so that their peripheries project both below the bottom of the cover a short distance and also forwardly of the forward edge of the cover as illustrated in Fig. 4.

When the cover is being raised to the position of Fig. 4 or lowered from such position, the wheels ride on the inclined rear wall portion 56 as illustrated in Fig. 4. After the cover has been lowered to the dotted line position of Fig. 4 it will float on top of the fat which may have a level such as the level 68 of Fig. 4.

A suitably supported transversely extending hanger plate 70 has a latch 71 connected to it as at 72. This latch may have an outwardly flanged lower edge 73 which is adapted to swing beneath the lower edge of the hanger plate 70 to project beyond the outer surface of said hanger plate when the parts are in the position of Fig. 4. The upper edge of the latch is flanged outwardly to provide a ledge 74 and then upwardly as at 75. A band spring 76, which acts between the rear surface of the hanger and the latch, tends to normally urge the upper portion of the latch inwardly toward the contact button 77' of a switch 77. The switch is wired in the circuit to the electric motor 59 to make or break the latter.

In operation of the form of the invention of Figs. 4 to 7 inclusive, when the basket 78 is on the hanger 70 as in Fig. 6 it presses inwardly on the flange 73 at the bottom of the latch 71 to maintain the upper part of the latch out of engagement with the motor switch button 77' so that the motor is off, the cover being in a position over the fat corresponding to the dot and dash line position of Fig. 4. When the basket is removed from the hanger, as is done when the cook wishes to use the fat, then it is desired that the floating cover 62 be out of the way. This is taken care of automatically. As soon as the basket is removed from the hanger there is no longer any pressure against the bottom latch flange 73, and the spring 76 is permitted to push the upper end of the latch into engagement with the motor switch button 77' to start the motor. Operation of the motor causes rotation of the sprocket wheel in a direction to pull upwardly on the chain 61'. This causes the cover wheels 65 to ride up the inclined rear wall portion 56. Fig. 7 shows the cover just before it has completed its upward movement. In this position the upper corner of the pan engages angularly disposed guiding means 79, and the latter directs the upper portion of the cover outwardly until it engages over the ledge 74 of the latch as shown in Fig. 4, said ledge serving to maintain the cover in elevated position and the spring 76 tending to push the latch into the cover. The forwardmost edge of the cover pushes outwardly on the upper portion 75 of the latch sufficiently to disengage it from the switch button 77' and thus shut off the motor. The inertia of the motor after it has been shut off is enough to raise the cover just high enough so that the ledge 74 can move freely into latching position, the edge of the cover preventing the portion 75 of the latch from moving inwardly far enough to engage the switch pin. When, with the cover in the raised position of Fig. 4, the food basket is placed on the hanger, the basket presses against the flange 73 of the latch to free it from engagement with the cover. The cover will then fall by gravity, checked by the friction of the motor, until it reaches the floating position of Fig. 6. The fat is thus protected until it is again to be used.

With the arrangement of Figs. 4 to 7 inclusive it is obvious that whenever the fry kettle basket is in place on the hanger 70 that the cover is in fat covering position, and that whenever the basket is off of the hanger the cover is automatically raised off of the fat to permit access thereto. Thus, movement of the cover 62 is fully automatic and responsive to manipulations of the basket. It is obvious that the inoperative position of the cover shown in Fig. 4 may be any position where it is clear of the fat.

The deck 62' on the cover 62 keeps the fat from filling the cover when the cover is being lowered and, as the forward end sinks below the surface until there is enough buoyancy for it to float. If it were not for the deck the cover would have to be made much deeper to prevent the entering end from sinking.

From the above it is apparent that the improved floating cover is automatically raised and lowered in response to manipulation of the frying basket without any attention from the cook. It is also apparent that in the form of the invention of Fig. 1 splashing is prevented because of the slow speed operation of the motor when the cover is lowered. At the same time the invention provides for a relatively quick movement of the cover out of the fat so that it is quickly out of the way so as not to delay the cook. In the preferred embodiment of the invention the raising of the cover takes less than two seconds and the lowering movement takes about five seconds to prevent splashing when the cover hits the fat.

It is apparent that means other than the arms 41 can be employed to operate the reversing switch in response to insertion or removal of the basket. Various other changes may be made without departing from the spirit of the invention, and all of such changes are contemplated, as may come within the scope of the claims.

What I claim is:

1. In combination, a fry kettle having a fat receiving portion and adapted to receive a food basket, a cover of a size to fit within said fat receiving portion in contact with and covering the fat therein, motor operated means for moving said cover out of fat covering position, means including a member positioned to be engaged by the food basket during manipulation thereof for controlling said motor, and means for stopping said motor after said cover has been moved a predetermined distance.

2. In combination, a fry kettle having a fat receiving portion and adapted to receive a food basket, a cover of a size to fit within said fat receiving portion in contact with and covering the fat therein, motor operated means for moving said cover into and out of fat covering position, means including a member positioned to be engaged by the food basket during manipulation thereof for controlling said motor, and means for stopping said motor after said cover has been moved a predetermined distance in either direction.

3. In combination, a fry kettle having a fat receiving portion and adapted to receive a food basket, a cover of a size to fit within said fat receiving portion in contact with and covering the fat therein, motor operated means for moving said cover out of fat covering position, means including a member positioned to be engaged by the food basket as it is being inserted in position in the kettle for controlling said motor, and means for stopping said motor after said cover has been moved a predetermined distance.

4. In combination, a fry kettle having a fat receiving portion and adapted to receive a food basket, a cover of a size to fit within said fat receiving portion in contact with and covering the fat therein, motor operated means for moving said cover into and out of fat covering position, means including a member positioned to be engaged by the food basket for actuation when the latter is being inserted in and removed from the kettle for controlling said motor to move the cover, and means for automatically stopping said motor after said cover has been thus moved a predetermined distance in either direction.

5. In combination, a fry kettle having a fat receiving portion and adapted to receive a food basket, a cover of a size to fit within said fat receiving portion in contact with and covering the fat therein, motor operated means for moving said cover into and out of fat covering position, a reversing switch for said motor, means including a member engageable with said reversing switch and positioned to be engaged by the food basket when the latter is being inserted in the kettle for actuating said reversing switch to start said motor in one direction and move the cover to fat exposing position, means for automatically stopping said motor after said cover has been thus moved a predetermined distance, said member which is engaged by the food basket being released when the basket is removed from the kettle, said reversing switch including means for operating the motor in a reverse direction upon said release to replace the cover on the fat, and means for automatically stopping said motor when the cover is in place over the fat.

6. A fry kettle having a fat receiving portion and adapted to receive a food basket, a cover of a size to fit within said fat receiving portion in contact with and covering the fat therein, an elongated flexible member connected to said cover, a reversible electric motor for exerting a pull on said flexible member in one direction or the other, an electric circuit for said motor including a reversing switch, and means including an arm engageable with said reversing switch and positioned to be engaged by the food basket when it is in position in the kettle for controlling the operation of said switch.

7. A fry kettle having a fat receiving portion and adapted to receive a food basket, a cover of a size to fit within said fat receiving portion in contact with and covering the fat therein, an elongated flexible member connected to said cover, a reversible electric motor for exerting a pull on said flexible member in one direction or the other to lower the cover onto the fat or to remove the cover from the fat, an electric circuit for said motor including a reversing switch, means including an arm positioned to be engaged by the frying basket when it is in position in the kettle for controlling the operation of said switch, and means in said electric circuit for causing operation of said motor at slow speed when the cover is being lowered.

8. In combination, a fry kettle having a fat receiving portion and adapted to receive a food basket, a cover of a size to fit within said fat receiving portion, a hanger for a food basket supported adjacent said kettle, motor operated means for moving said cover out of fat covering position, means responsive to disengagement of a food basket from said hanger for starting said motor, and means for stopping said motor after said cover has been moved to a position a predetermined distance out of the fat.

9. In combination, a fry kettle having a fat receiving portion and adapted to receive a food basket, a cover of a size to fit within said fat receiving portion, a hanger for a food basket supported adjacent said kettle, motor operated means for moving said cover out of fat covering position, means responsive to disengagement of a food basket from said hanger for starting said motor, and means for releasably holding said cover in said position out of the fat.

10. In combination, a fry kettle having a fat receiving portion and adapted to receive a food basket, a cover of a size to fit within said fat receiving portion, a hanger for a food basket supported adjacent said kettle, motor operated means for moving said cover out of fat covering position, means responsive to disengagement of a food basket from said hanger for starting said motor, means for stopping said motor after said cover has been moved to a position a predetermined distance out of the fat, and means for releasably latching the cover in said position.

11. In combination, a fry kettle having a fat receiving portion and adapted to receive a food basket, a cover of a size to fit within said fat receiving portion, guiding means for directing movement of said cover into and out of fat covering position, an elongated flexible member connected to said cover, motor operated means for exerting a pull on said flexible member to move the cover on said guiding means out of fat covering position, a basket hanger supported adjacent said kettle, and means adjacent said hanger and responsive to removal of a basket from the hanger for starting said motor.

12. A fry kettle having a fat receiving portion and having a first wall and a second wall opposite said first wall, a pan-shaped cover of a size to fit within said fat receiving portion to float thereon, a deck covering part of the top of said pan-shaped cover near an edge which is adjacent said first wall of the kettle, an elongated flexible member connected to an opposite portion of the cover, means above said first wall for guiding and supporting said elongated member so that said cover may be suspended in generally upright position above the fat with its deck portion positioned to contact the fat first and with its opposite portion thereabove, the point of connection of the flexible member with the cover being such that said deck portion tilts in a direction away from said second wall of the kettle out of vertical alinement with said top portion of the cover when the latter is in suspended position, and means controlling lowering movement of the flexible member for lowering the cover into the fat, said deck preventing entrance of fat into the cover as the edge of the cover near said deck contacts the fat and forms a hinge for further lowering movement of the rest of the cover to bring the opposite wall of the cover down on the fat adjacent the second wall of the kettle.

13. A fry kettle having a fat receiving portion and having a first wall and a second wall opposite thereto, a cover of a size to fit within said fat receiving portion, guiding means for directing movement of the cover from horizontal fat covering position to an upright position clear of the fat and above said first wall, an elongated flexible member connected to that portion of said cover which is near the second wall of the fat receiving portion when the cover is in fat covering position, and motor means for exerting a pull on said flexible member to move the cover on said guiding means out of fat covering position to said upright position.

References Cited in the file of this patent

UNITED STATES PATENTS

| | | |
|---|---|---|
| 251,245 | King | Dec. 20, 1881 |
| 1,575,033 | Bown | Mar. 2, 1926 |